United States Patent [19]

Bair, Jr.

[11] 3,996,760

[45] Dec. 14, 1976

[54] METHOD AND APPARATUS FOR PRODUCING FROZEN CONFECTIONS HAVING SPIRAL FINS

[75] Inventor: Sydney L. Bair, Jr., Overland Park, Kans.

[73] Assignee: Merritt Foods Company, Kansas City, Mo.

[22] Filed: Sept. 15, 1975

[21] Appl. No.: 613,210

[52] U.S. Cl. .................................... 62/73; 62/1; 62/345; 425/436 R; 426/515
[51] Int. Cl.$^2$ ................. F25B 1/10; A23G 9/00
[58] Field of Search ............ 425/436 R; 62/345, 1, 62/356, 73; 426/515, 144

[56] References Cited

UNITED STATES PATENTS

| | | | |
|---|---|---|---|
| 275,298 | 4/1883 | Wallace | 65/316 |
| 2,212,991 | 8/1940 | Sobel | 425/436 X |
| 2,700,347 | 1/1955 | Gram et al. | 425/436 X |

*Primary Examiner*—William E. Wayner
*Attorney, Agent, or Firm*—Lowe, Kokjer, Kircher, Wharton & Bowman

[57] ABSTRACT

A conveyor carries a plurality of frozen confection molds evenly spaced within rows. The molds incorporate a plurality of uniform spiral grooves to form spiral fins on the frozen confections. Ingredients are inserted into the molds and frozen with sticks embedded therein. An extractor arm is positioned above the row of frozen product and lowered to cause clamps to grip the sticks. When the extractor arm is raised, a cam pivots the clamps about a vertical axis to permit the fins to follow the spiral contour of the mold grooves as the frozen confections are withdrawn from the molds. The frozen confections are subsequently released from the clamp elements by a trip bar which simultaneously opens the jaws of the clamps.

9 Claims, 9 Drawing Figures

METHOD AND APPARATUS FOR PRODUCING FROZEN CONFECTIONS HAVING SPIRAL FINS

BACKGROUND AND SUMMARY OF THE INVENTION

This invention relates generally to the production of frozen confections on sticks and more particularly to a method and apparatus for producing frozen confections that have longitudinal spiral fins.

Modern production of a frozen confection begins by pouring liquid ingredients into an open topped mold cavity or pocket suspended in a cold brine solution. When the ingredients have substantially congealed, a stick is partially inserted. Continued exposure to the brine solution solidly freezes the ingredients and embeds the stick therein. The mold is next defrosted to melt the interface of the ingredients and mold. The product is then pulled out of the mold by the stick and packaged for sale.

There are currently two types of machines that employ the above technique and are widely used in the mass production of frozen confections. One type includes a rotating ring mold (i.e., circular conveyor) that carries a plurality of radial rows of mold pockets in a circular path. The conveyor is incrementally rotated at a preselected time interval to move each row of molds through successive zones or stations wherein ingredients are added to the molds and partially frozen, sticks are inserted, the ingredients are frozen solid with the sticks embedded, and the row of molds is then defrosted. At a product removal station, a rotary drum offset to the side of the circular conveyor supports a plurality of radial arms, each of which carries a series of spaced clamps and which extends over the conveyor. Intermittent rotation of the drum successively positions each arm above a row of molds at the removal station and lowering of the arm causes the clamps to grip the upwardly projecting sticks. The arm is then raised upwardly to draw the frozen confections from that particular row of molds. Subsequent rotation of the drum moves the arm to a packaging station where the product is wrapped and boxed.

The second type of machine popular for mass production operates in virtually the same manner as the first, except the mold pockets are carried in a straight line, belt-type conveyor. Product is still removed from each row of molds at the removal station by means of the down and up strokes of an arm having spaced clamping jaws which grip the sticks of the confections.

Over the years, frozen confections of various shapes have been developed in efforts to enhance their appeal to consumers. One type of confection that has gained public acceptance comprises a solid body having a plurality of fins which are symmetrically arranged and project outwardly from the longitudinal axis of the piece. An example of such design is shown in U.S. Design Pat. No. D-205,876 issued Sept. 27, 1966.

Symmetrical designs in the prior art for frozen confections are characterized in having no vertically undercut surface. This has resulted from production considerations that require the vertical lifting of the frozen confection by its associated stick from the mold in which it is formed. An undercut surface on the piece would thus preclude conventional removal techniques.

Recently new designs for frozen confections have been proposed to give a "barber-pole" effect in which projecting fins uniformly spiral the length of the piece. Such designs are depicted in my U.S. Pat. Nos. D-230,907 and D-230,908, both issued Mar. 26, 1974. Inasmuch as these new designs have undercut surfaces, they depart dramatically from conventional production standards. In particular, a serious problem is presented in removing the frozen confections from the molds in which they are frozen. Existing machines are not suited for removing product having spiral fins because they operate to lift frozen confections upwardly from the mold and are therefore unable to maintain the spiral fins intact.

It is therefore the primary object of the present invention to provide a method and apparatus for producing frozen confections having spiraled longitudinal fins.

In conjunction with the preceding object, it is a further object of the invention to provide a method and apparatus of the character described that removes the frozen confection from molds in a manner whereby the fins are not damaged. It is a unique feature of the invention that each frozen confection is pivoted as it is raised from the mold to assure that the spiral fins follow the curved contour of the mold grooves in which they are formed.

Another object of the invention is to provide apparatus of the character described that is constructed economically for reliable operation.

Yet another object of the invention is to provide apparatus of the character described in which the various components are readily accessible for repair and maintenance purposes.

Other and further objects of the invention together with the features of novelty appurtenant thereto, will appear in the course of the following description of the drawings.

DETAILED DESCRIPTION OF THE INVENTION

In the accompanying drawings, which form a part of the specification and are to be read in conjunction therewith, and in which like reference numerals are employed to indicate like parts in the various views.

Figures 1, 2:
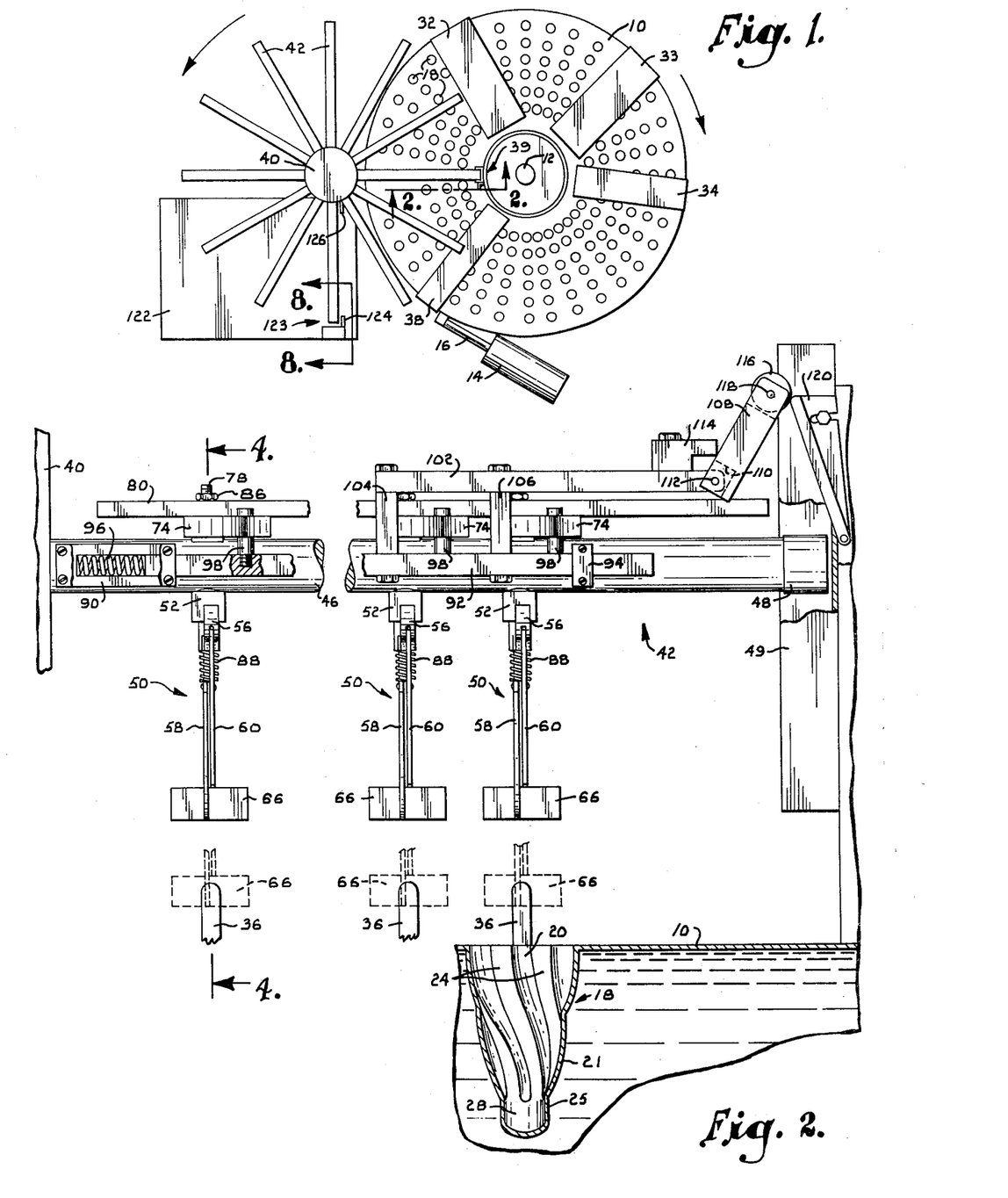
FIG. 1 is a top plan view diagrammatically illustrating the overall arrangement of an apparatus used to produce frozen confections.
FIG. 2 is an enlarged, fragmentary elevational view taken generally along line 2—2 of FIG. 1 in the direction of the arrows and depicting an extractor arm constructed in accordance with the invention, with portions broken away to better illustrate the details of construction and the broken line view showing the position of the clamps when the extractor arm is moved downwardly.

Referring now to the drawings in detail and initially to FIG. 1, apparatus for producing frozen confections having spiral fins includes an endless annular conveyor 10 that is supported to rotate in a horizontal disposition about a central axis 12. A drive mechanism for intermittently advancing conveyor 10 may be of any appropriate type, such as a conventional hydraulic cylinder 14 which is actuated at preselected time intervals to extend and retract its piston rod 16. The end of piston rod 16 conventionally engages the periphery of conveyor 10 to rotate the conveyor a preselected distance in a clockwise direction in response to extension of the piston rod, while retraction of piston rod 16 does not move the conveyor.

Figure 6:
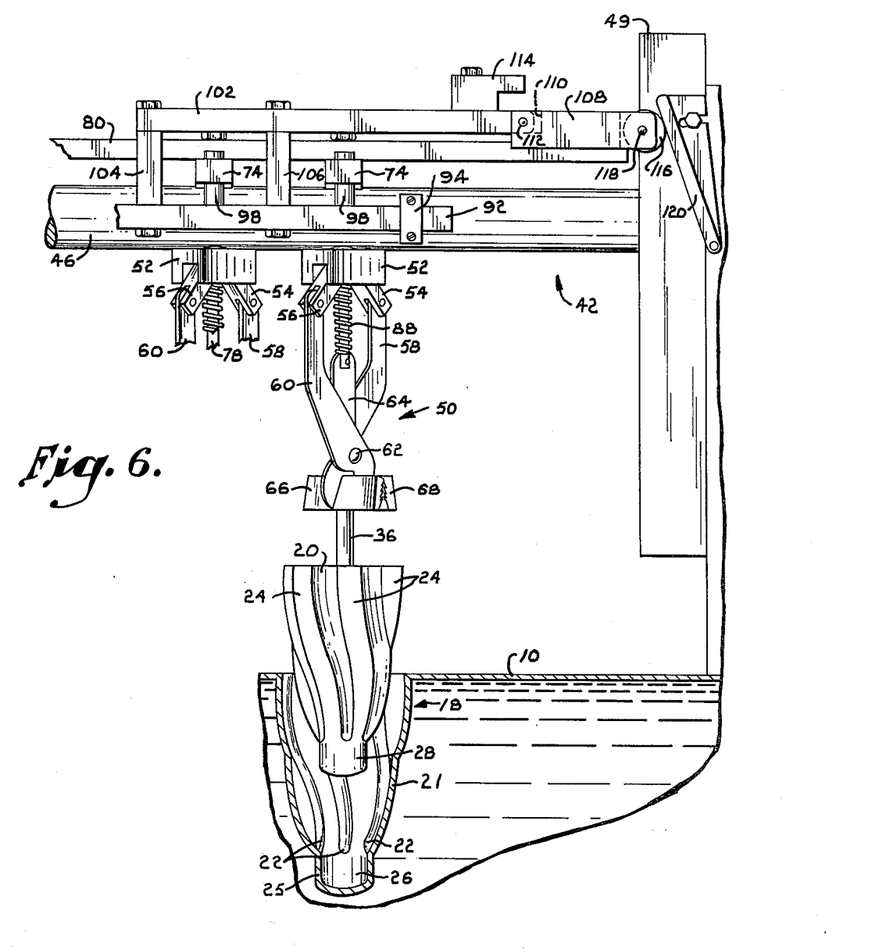
FIG. 6 is a fragmentary elevational view of the arm shown in FIGS. 2 and 5, but with the arm having been raised from the FIG. 5 position to partially remove a frozen confection from its mold.
Figure 7:
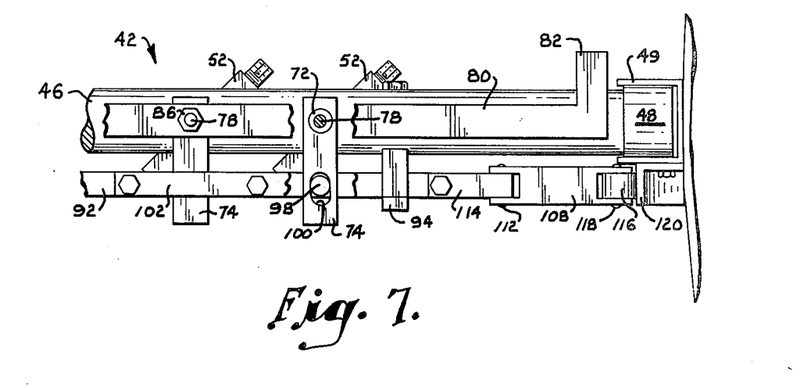
FIG. 7 is a fragmentary top plan view of the arm shown in FIG. 6, with portions broken away to more clearly illustrate structural details.

A plurality of identical molds which are designated by reference numeral 18 are carried on conveyor 10. Molds 18 are supported in a vertical orientation adjacently below the upper surface of the conveyor and are arranged in a plurality of equally spaced radial rows. With particular reference to FIGS. 2 and 6, each mold 18 presents a cavity having a shape identical to the desired shape of a frozen confection 20 that is to be formed therein. Each mold has a curved wall section 21 that gradually tapers inwardly from top to bottom. The tapered wall section 21 of each mold has a plurality of generally spiral shaped grooves 22 (FIG. 6) formed therein and parallel to one another. Grooves 22 uniformly curve along the length of wall section 21 and about the longitudinal axis of the mold with a uniform degree of spiral throughout the length thereof. The spiral configuration of grooves 22 permits a series of spaced spiral fins 24 to be formed on the tapered bodies of the frozen confections 20 that are shaped in molds 18.

An end wall section 25 extends integrally downwardly from the lower end of the wall section 21. Wall section 25 forms a cylindrical well 26 (FIG. 6) having a dished bottom that is centrally located at the bottom of each mold 18. A domed tip 28 is thereby formed in well 26 on the end of each frozen configuration 20. Thus, the foregoing molds 28 are so shaped to produce frozen confections in the form of my design patent No. D-230,907, issued March 26, 1974. The specific shape of the product is unimportant, however, since the present invention is adapted to produce any confection having spirally undercut vertical surfaces so long as the spiral is uniform throughout its length.

Referring again to FIG. 1, the manner of making frozen confections and the basic equipment involved are well known to those skilled in this art. For this reason FIG. 1 is somewhat schematic. The desired ingredients of frozen confections 20 are initially added to molds 18 at fill station 32. A subsequent ingredient station, such as station 33, may likewise be suitably located along the path of conveyor 10 to add additional ingredients if the product is to have a layered effect. Each station 32 and 33 includes conventional equipment (not shown) that operates automatically to insert measured quantities of ingredients into each row of molds 18. The ingredients are inserted in a fluid state whereby they flow freely and assume the shape of molds 18.

It is of course conventional to circulate a cold brine solution around the molds 18 in order to congeal the ingredients. By the time the particular radial row of molds 18 advances from the initial fill station 32 to station 34, the ingredients are in a semi-frozen condition. Station 34 represents a conventional stick inserting apparatus which automatically places a stick 36 centrally in each mold pocket 18 so that a portion of the stick 36 protrudes above the mold, retained there by the congealed ingredients. During further rotative advancement of the conveyor 10, the molds 18 are continually immersed in the brine solution and the ingredients are thus solidly frozen prior to arriving at a defrost zone or station 38. At zone 38, the molds 18 are defrosted by the conventional technique in order to melt the interface bond of the ingredients with the interior of the mold before advancement to the extractor station designated generally by the numeral 39.

Figure 4:
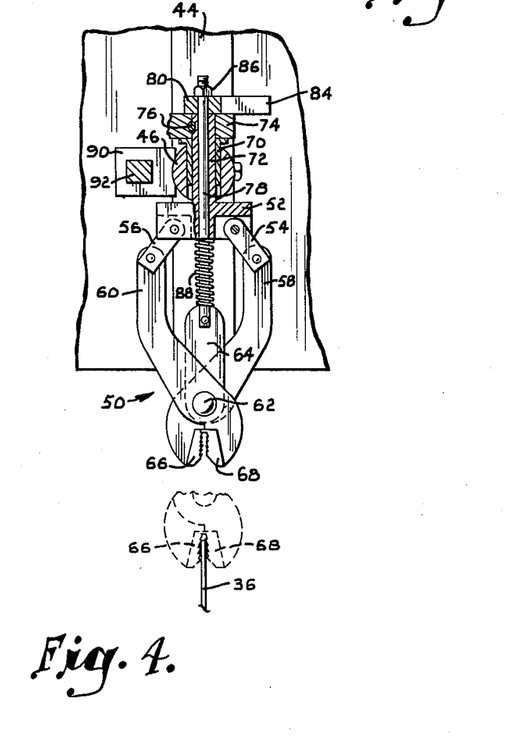
FIG. 4 is a sectional view taken generally along line 4—4 of FIG. 2 in the direction of the arrows, with the broken line view showing the clamp gripping a stick when the extractor arm is lowered.

A cylindrical pedestal or drum 40 of an extractor mechanism, likewise conventional for this type of production machine, is mounted for rotation at a location offset to the side of conveyor 10 near the periphery thereof. A plurality of horizontal extractor arms 42 are supported to extend radially outwardly from drum 40 in equally spaced relation and at an elevation above that of conveyor 10. Each arm 42 is of a length to extend over the radial row of molds 18 at the extractor station 39. With particular reference to FIG. 4, a plurality of spaced vertical slots 44 are formed in the periphery of drum 40. One end of each arm 42 is received in each slot 44 and supported interiorly for up and down movement while maintained in a horizontal position. Drum 40 is rotatively driven in a counterclockwise direction (as viewed in FIG. 1) about a central vertical axis by conventional drive means (not shown) that operates intermittently to move arms 42 ahead a preselected distance and also to move the individual horizontal arms 42 up and down in their respective slots 44 as will become apparent.

The main structural component of each extractor arm 42 is a solid cylindrical bar 46 which has its inward end supported interiorly of the drum 40 and which projects through an associated slot 44. An enlarged collar 48 is carried on the opposite or outer end of each bar 46. Each collar 48 is sized to slidingly fit within the groove of a guide channel 49 located at the extractor station 30. The channel 49 is supported on the central supportive framework of the conveyor 10.

A plurality of identical clamps which are each generally designated by numeral 50 are supported for pivotal movement on the underside of each bar 46. Clamps 50 are spaced equally from one another along the length of each bar 46, with the spacing between the clamps corresponding to the spacing between the molds 18 contained in each radial row of molds.

Clamps 50 are constructed identically. With particular reference to FIG. 4, each clamp 50 includes a rectangular base block 52 which is supported adjacent the underside of bar 46 and is normally oriented laterally perpendicular thereto. The underside of block 52 is provided with recessed areas at both ends. A short lever 54 having a rounded top end is pivotally pinned within one of the recessed areas of block 52, and the rounded top end of an identical lever 56 is pivotally pinned within the opposite recessed area of the block. Levers 54 and 56 angle outwardly and downwardly from the respective opposite ends of block 52, and each lever is slotted at its lower end. The rounded top end of a thin, curved scissor arm 58 is received by and pivotally pinned within the slot of lever 54, while an identical but opposed scissor arm 60 is pivotally pinned at its rounded top end within the slot of arm 56. Arms 58 and 60 are disposed in closely spaced planes and curve inwardly to cross somewhat above their lower ends. A pivot coupling 62 pivotally pins arms 58 and 60 together and also pins the rounded bottom end of a thin spacer plate 64 between the arms. Plate 64 is oriented vertically with its top end located below the top ends of arms 58 and 60 for connection to release rod 78 as will later be described.

The bottom end of arm 58 carries a transverse jaw 66 which is oriented perpendicular to arm 58 and which is of substantial length as compared to the width of the product stick 36 as best shown in FIG. 2. Returning to FIG. 4, jaw 66 includes a plurality of sharp teeth that face inwardly. An identical but opposed jaw 68 is transversely carried on the bottom of arm 60 with its teeth facing in opposition to those of jaw 66 and normally spaced closely therefrom. Jaws 66 and 68 have cooperating lower surfaces which taper inwardly toward the jaw teeth to facilitate the entry of a stick 36 into the jaws. The teeth of jaws 66 and 68 are angled upwardly to readily permit a stick 36 to slide between the jaws, while an inserted stick is firmly gripped by the teeth and prevented from slipping out of the closely spaced jaws.

To pivotally mount clamps 50, a plurality of cylindrical openings are formed vertically through each bar 46 at spaced positions along the length of the bar. A bushing 70 having a flanged head and a central cylindrical bore is closely fitted into each cylindrical opening with the enlarged head of each bushing engaging the top of bar 46. Each bushing 70 has smooth bearing surfaces on top of its flanged head and through its internal bore. A cylindrical post 72 is rigidly secured to each block 52 to extend upwardly from the center of the upper face of block 52. Posts 72 are received within the central bores of the respective bushings 70 for axial pivoting therein.

A plurality of short horizontal levers 74 are connected to the upper ends of respective posts 72 and are disposed in parallel relation. Each lever 74 is bored to fit over the upper end of post 72 and a locking pin 76 is forced into a transverse slot formed in the lever 74 and post 72 to rigidly join the members. The inward end of the lever 74 bears on the bearing surface of the flanged head of the associated bushing 70.

Figure 3:
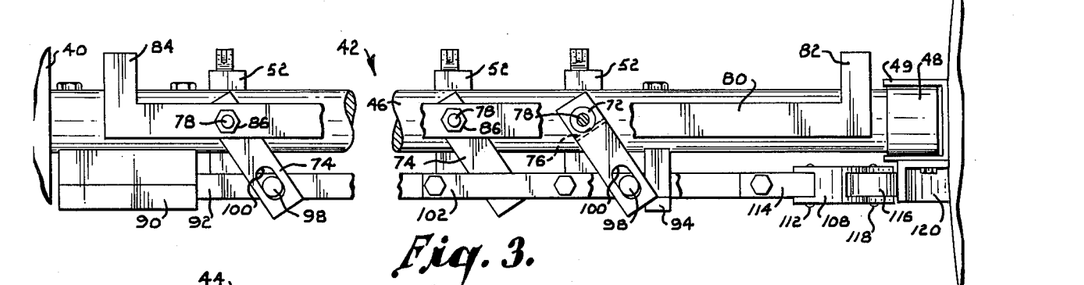
FIG. 3 is a top plan view of the arm shown in FIG. 2, with portions broken away to more clearly illustrate structural details.

The rounded top end of each plate 64 is pinned in a slot formed in the bottom end of an elongate vertical release rod 78. Each rod 78 is freely extended through aligned bores which are formed centrally through block 52 and post 72 and which permit rod 78 to slide longitudinally therein. An elongate horizontal bar 80 of rectangular configuration is disposed above bar 46 and is parallel thereto. Bar 80 extends horizontally to normally rest on the respective levers 74 at locations directly above the top ends of the respective posts 72. Bar 80 is somewhat shorter than bar 46 and has respective integral projections 82 and 84 extending to the side to form L-shaped feet at its opposite ends (FIG. 3). Bar 80 is provided with a plurality of spaced vertical bores through which extend the release rods 78. The top end of each rod 78 is threaded to receive a nut 86, each of which is tightened down against the top surface of bar 80. A compression spring 88 encircles the lower portion of each rod 78 between the underside of block 52 and the top end of plate 64. Springs 88 thereby yieldably bias rods 78 and plates 64 (and consequently, the scissor joint at pin 62) downwardly to normally position each clamp 50 as shown in FIG. 4 with the teeth of its jaw 66 and 68 closely spaced. However, sufficient upward force on bar 80 overcomes the biasing force of springs 88 so as to pull each rod 78 and each plate 64 upwardly to thereby separate each pair of jaws 66 and 68 as the articulated joint between lever 54 and scissor arm 58 and between lever 56 and scissor arm 60 moves outwardly to spread apart scissor arms 58 and 60 and to cause the jaws 66 and 68 to pivot about coupling 62 to the position shown in FIG. 9.

Turning now to FIGS. 2 and 3, a rectangular housing 90 is secured to the side of bar 46 near the inward end thereof. One end of an elongate square bar 92 is extended into a square bore formed in housing 90. A guide bracket 94 is secured to bar 46 on the outer, opposite end thereof and in alignment with housing 90. Guide 94 is provided with a square opening through which bar 92 is slidably extended. A compression spring 96 is retained within the bore of housing 90 and in engagement with the end of bar 92 to thereby yieldably bias the bar outwardly.

A series of upright cylindrical studs 98 are spacingly attached along the length of bar 92. Each lever 74 has an elongate opening 100 near its outer end which receives a corresponding stud 98 of bar 92. Levers 74 are parallel to one another, and each lever is normally angled at approximately 45° to bars 46 and 92 due to the biasing force exerted on bar 92 by spring 96. In such position, the jaws 66 and 68 are longitudinally aligned with the axis of bar 46. However, sufficient longitudinal force exerted inwardly on bar 92 overcomes the force of spring 96 and causes the respective studs 98 to engagingly pivot levers 74 to simultaneously impart rotative movement to the clamp assemblies 50.

A shorter bar 102 is rigidly mounted above bar 92 in parallel relation thereto. A pair of vertical posts 104 and 106 are secured to extend upwardly from bar 92 at spaced locations inwardly of bracket 94. The inward end of bar 102 is rigidly secured to the top end of post 104, while an intermediate portion of bar 102 is secured to the top end of post 106. The rigid linkage between bars 92 and 102 assures that a longitudinal force exerted on either bar is translated directly to the other bar.

Figure 5:
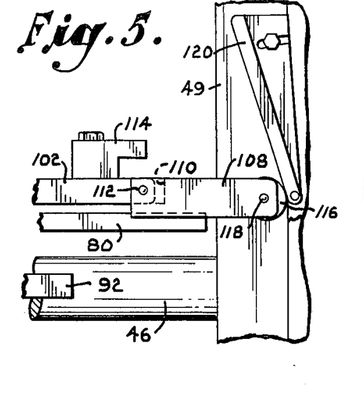
FIG. 5 is a fragmentary elevational view of the right end portion of the extractor arm shown in FIG. 2, but with the arm lowered from the solid line position of FIG. 2 to move the clamps to the broken line position of FIG. 2.

A lever 108 is mounted on the outer end of bar 102 for limited pivotal movement about a horizontal axis. The inward end of lever 108 is provided with a channel 110 in which bar 102 is pinned at 112 and which partially underlies bar 102 to normally hold lever 108 in longitudinal alignment with bar 102 as shown in FIG. 5. However, lever 108 may pivot upwardly a limited distance to engage stop 114 which is secured to the top of bar 102. Lever 108 has a slot formed in its outer end within which a small wheel 116 is rotatably carried. A pin 118 is utilized to mount wheel 116 to lever 108 with the peripheral edge of the wheel extending outwardly from the end of lever 108.

At the extractor station 39, an incline cam 120 is adjustably secured to the side of guide channel 49. The lower end of cam 120 is pinned for pivotal movement and the upper end is inclined toward the end of extractor arm 42. The camming surface itself is flat and straight, being adapted for engagement by wheel 116 mounted on the end of extractor arm 42.

Figure 8:
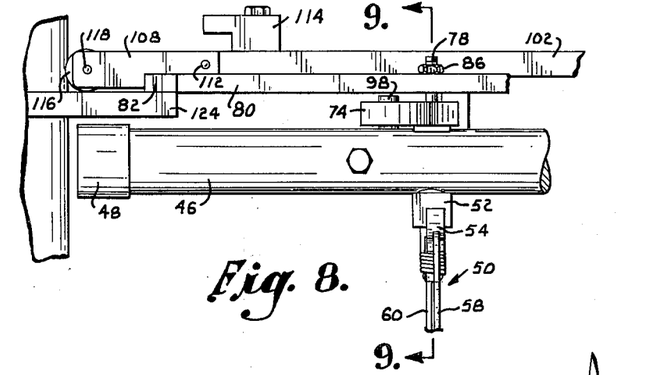
FIG. 8 is an enlarged, fragmentary, elevational view taken generally along line 8—8 of FIG. 1 in the direction of the arrows and showing the extractor arm being positioned to release frozen confections from the clamps.
Figure 9:
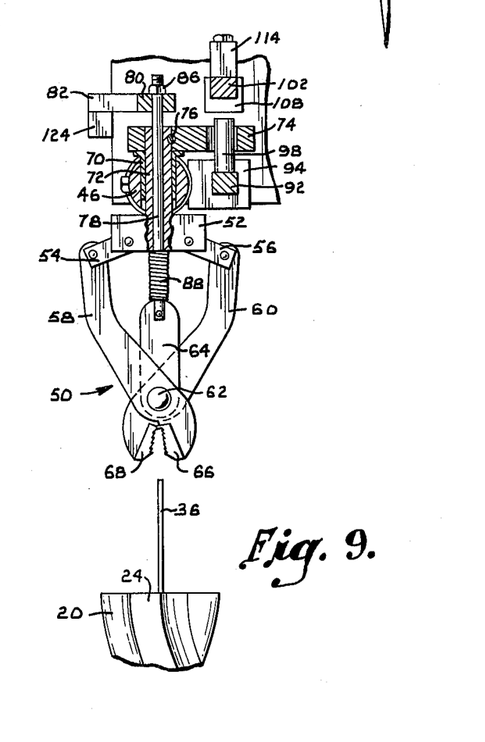
FIG. 9 is a sectional view taken generally along line 9—9 of FIG. 8 in the direction of the arrows.

A wrapping unit station 122 is offset to one side of drum 40 and lower than the height of the extractor arms 42. A horizontal tripping lever 124 is mounted near the outer edge of station 122, while a similar tripping lever 126 is mounted near drum 40. Referring particularly to FIGS. 8 and 9, levers 124 and 125 are positioned to engage the respective projections 82 and 84 on the opposite ends of bar 80 when the bar is positioned above station 122 at the discharge position 123 and thereafter lowered by the drive mechanism associated with drum 40. As previously described, the upward force of bar 80 causes rods 78 to open the jaws of the clamps 50 and discharge the product. Station 122 may include conventional wrapping equipment (not shown) which receives the discharged confections 20 and automatically packages them in individual wrappers.

In operation, conveyor 10 and drum 40 are oppositely and intermittently rotated in a synchronized relationship. Each extension of piston rod 16 rotates conveyor 10 clockwise to move each radial row of molds 18 to the position where the adjacent row was previously located. Drum 40 is rotated counterclockwise in a start-stop fashion to move each arm 42 to the position where the adjacent arm was previously located. As each row of molds is temporarily stopped at fill station 32, a measured quantity of ingredients is inserted into each of the molds 18 in the row. Additional ingredients may thereafter be added when the row of molds reaches station 33. Sticks 36 are subsequently inserted at station 34 to project vertically from the molds 18 in alignment along the radius of particular rows of molds. After the ingredients are solidly frozen with the embedded sticks 36 and the row of molds 18 is defrosted to loosen the product, the subject row of molds is subsequently moved to the extractor station 39.

At the extractor station 39, one of the arms 42 will be positioned above the row with the clamps 50 on the arm aligned directly above the molds. The arm is then lowered to cause the clamps 50 to approach the sticks 36 which project upwardly from molds 18. As clamps 50 reach the fully lowered position shown in broken lines in FIG. 2, the jaws 66 and 68 slide over the top ends of the respective sticks 36 to firmly grip the sticks between the opposed sets of teeth.

As extractor arm 42 is lowered, the collar 48 on the end of bar 46 enters the groove of guide channel 49. Pivot arm 108 initially engages the horizontal top edge of cam 120 and pivots upwardly from its normally horizontal position. When wheel 116 reaches the rounded corner at the top of the inclined cam 120 (the position of FIG. 2), lever 108 is pivoted upwardly to a position where it is engaged by block 114. As wheel 116 clears the end of cam 120, it thereafter rolls downwardly along the inclined surface and lever 108 gradually pivots downwardly due to its own weight. When arm 42 has been fully lowered to the position shown in FIG. 5, lever 108 is again disposed horizontally. It is noted that the pivotal mounting of lever 108 permits same to yieldably pivot as arm 42 is lowered. Consequently, no appreciable force is exerted on bar 102 and the force of spring 96 maintains clamps 50 in alignment with the longitudinal axis of arm 42 to permit each pair of jaws 66 and 68 to grip sticks 36 at the proper angular position.

After clamps 50 have been fully lowered into gripping engagement with sticks 36, the extractor arm 42 is raised to withdraw frozen confections 20 from molds 18. At its lowermost position (FIG. 5), lever 108 extends horizontally with wheel 116 engaging the extreme bottom of the incline cam 120. The engagement of bar 102 with the underside of recess 110 retains lever 108 in a rigid horizontal disposition as arm 42 is raised to move wheel 116 upwardly along the cam surface. The resultant camming action acts through the crank-like linkage of bars 102 and 92, levers 74 and posts 72 to gradually pivot clamps 50 as they are simultaneously raised. Upon the raising of arm 42, bar 102 is immediately forced longitudinally inwardly due to the rigidity of lever 108. The movement imparted to bar 92 overcomes the force of spring 96 and moves the latter bar inwardly, which in turn moves studs 98 against lever 74. The torque thereby exerted on levers 74 cranks each lever about its inward end and results in axial pivoting of the rigidly connected posts 72 within bushings 70. It is pointed out that studs 98 are permitted to move as required due to the elongate openings 100. The pivotal movement imparted to posts 72 pivots clamps 50 about respective vertical axes defined at the axes of posts 72. The cam 120 is adjusted to the proper degree of inclination to assure that the rate at which clamps 50 are pivoted as they are raised is such that spiral fins 24 follows the contour of grooves 22 as frozen confections 20 are raised from the molds 18.

Fins 24 remain within grooves 22 until arm 42 has been raised approximately to the position shown in FIG. 6. At this point, the upward movement will have carried fins 24 out of grooves 22 because of the tapered configuration of molds 18 and frozen confections 20. As wheel 116 subsequently clears the top of cam 120, the force of spring 96 pushes bar 92 outwardly, whereupon each clamp 50 pivots back to its normal position. Since fins 24 are no longer disposed in grooves 22, the frozen confections 20 are permitted to pivot freely without damaging the fins. After arm 42 has been fully raised, conveyor 10 and drum 40 are again rotated to position another row of molds at the extractor station 39 beneath a subsequent extractor arm 42, which is thereafter lowered to pick up frozen confections from the second row of molds.

After an extractor arm 42 has picked up a row of frozen confections 20, the intermittent counterclockwise rotation of drum 40 eventually moves the arm to the discharge position 123 at the wrapping station 122, at which time the arm 42 is again lowered. However, before the arm has been completely lowered, the projections 82 and 84 on the opposite ends of bar 80 will have moved into engagement with the respective tripping levers 124 and 126. Since bar 80 thereafter remains stationary as the main support bar 46 continues to drop, an upward force is exerted on each rod 78 due to the engagement between bar 80 and nuts 86. The upward force imparted to plate 64 pulls each coupling 62 upwardly and thereby pivots each pair of scissor arms 58 and 60 about coupling 62. As each pair of jaws 66 and 68 move apart, sticks 36 are released and each frozen confection 20 is discharged.

It should be evident that the present invention is equally suited for use with conveyors other than the annular type and with arm supports other than a rotary drum. In particular, it is contemplated that the apparatus disclosed herein will also be utilized in such systems that employ straight conveyors to carry the molds and extractor arms horizontally disposed above the path of the conveyor.

It is also worthy of mention that varying the angle of inclination of the cam 120 will facilitate removal of product having various degrees of twist. The criteria to be met, however, is that the twist or spiral must be uniformly constant throughout the length of the undercut surface.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be understood as illustrative and not in a limiting sense.

Having thus described my invention, I claim:

1. A method for producing a stick frozen confection having uniformly spiraled longitudinal fins, said method comprising the steps of:
   providing a mold having a cavity contoured complementary to the shape of the frozen confection and including a plurality of uniformly spiraled grooves for forming the fins of the frozen confections;
   inserting fluid ingredients of the frozen confection into said mold;
   inserting a stick member into said mold to project vertically therefrom;
   freezing solidly the ingredients to form the frozen confection with the stick embedded therein;
   defrosting said mold to melt the interface of the frozen confection and mold cavity;
   gripping the stick projecting from said mold;
   raising vertically the frozen confection from said mold while simultaneously rotating the frozen confection at a uniform rate whereby the fins of the frozen confection follow said spiraled grooves of the mold cavity as the frozen confection is withdrawn.

2. The method as in claim 1, said last step including simultaneously and instantaneously rotating the frozen confection at a uniform rate as the frozen confection is withdrawn, said uniform rate of rotation being a constant pivotal displacement about the vertical longitudinal axis of the confection per the linear vertical displacement of the confection.

3. Apparatus for producing stick frozen confections having uniformly spiraled longitudinal fins, said apparatus comprising:
   a conveyor;
   drive means for intermittently moving said conveyor;
   a plurality of molds carried on said conveyor, said molds having cavities contoured complementary to the shape of the frozen confections and including a plurality of uniformly spiraled grooves for forming the fins of the frozen confections;
   means for inserting fluid ingredients of the frozen confections into said molds;
   means for inserting stick members into the ingredients contained in said molds whereby said stick members project vertically from said molds and above said conveyor;
   cooling means for freezing said ingredients within said molds to form the frozen confections with said stick members embedded therein;
   a horizontal arm member supported for movement along a predetermined path above said conveyor and for selective vertical up and down strokes toward and away from said conveyor;
   a plurality of spaced clamp elements carried by said arm member for limited pivotal movement about respective vertical axes, said axes orientable in substantially vertical alignment with the longitudinal axes of said molds whereby each of said clamp elements is adapted to grippingly engage one of said stick members on the down stroke of said arm;
   power means for intermittently advancing said arm member along said predetermined path, said power means being operable to successively lower said arm member to move said clamp elements thereon into gripping engagement with said stick members, and to successively raise said arm member to withdraw said frozen confections from said molds;
   means for pivoting said clamp elements about said respective pivot axes as said arm member is raised, said pivot means uniformly pivoting said clamp elements whereby the fins of the frozen confections follow the contour of said mold grooves as the frozen confections are withdrawn from said molds; and
   means for selecting said stick members from said clamp elements to discharge said frozen confections.

4. The apparatus as in claim 3, wherein said pivot means includes a cam mechanism associated with said arm member and coupled to the clamp elements supported thereon, said cam mechanism being operable upon the raising of said arm member to simultaneously and uniformly pivot the clamp elements about said respective pivot axes.

5. The apparatus as in claim 4, including crank means coupling said cam mechanism to said clamp elements, said crank means and cam mechanism cooperating upon the raising of said arm member to pivot the clamp elements supported thereon about said respective pivot axes.

6. The apparatus as in claim 3, wherein said pivot means includes a cam follower associated with said arm member and a cam surface remote from said arm member and positioned to engage said cam follower upon the raising of said arm member, said pivot means including linkage coupling said cam follower to said clamp elements, said linkage being actuated by said cam follower upon the raising of said arm member to uniformly and simultaneously pivot said clamp elements about said respective pivot axes.

7. The apparatus as in claim 6, wherein said linkage includes a crank mechanism operable to pivot said clamp elements about said respective pivot axes with the raising of said arm member.

8. Apparatus as set forth in claim 6, including means for yieldably biasing said clamp elements to a preselected pivotal orientation.

9. Apparatus as set forth in claim 8, wherein said cam surface is positioned to engage said cam follower upon the lowering of said arm member, said linkage including a cam lever and means supporting said cam lever for yieldable pivoting movement when said arm member is lowered to permit said clamp elements to remain in said preselected pivotal orientation as the latter are moved into gripping engagement with said stick members, said support means maintaining said lever in a rigid disposition upon the raising of said arm member to actuate said linkge and thereby pivot said clamp elements about said respective pivot axes.

* * * * *

UNITED STATES PATENT OFFICE
CERTIFICATE OF CORRECTION

Patent No. 3,996,760  Dated December 14, 1976

Inventor(s) Sydney L. Bair, Jr.

It is certified that error appears in the above-identified patent and that said Letters Patent are hereby corrected as shown below:

Column 10, line 25, "selecting" should read
-- feleasing --.

Signed and Sealed this

Fifteenth Day of February 1977

[SEAL]

*Attest:*

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,996,760    Dated December 14, 1976

Inventor(s) Sydney L. Bair, Jr.

It is certified that error appears in the above-identified patent and that said Letters Patent are hereby corrected as shown below:

In claim 3, the third line from the bottom, "selecting" should read -- releasing --.

This certificate supersedes Certificate of Correction issued February 15, 1977.

Signed and Sealed this

Nineteenth Day of April 1977

[SEAL]

Attest:

RUTH C. MASON
Attesting Officer

C. MARSHALL DANN
Commissioner of Patents and Trademarks